(12) United States Patent
Andrivon et al.

(10) Patent No.: US 12,081,744 B2
(45) Date of Patent: Sep. 3, 2024

(54) IN-LOOP RESHAPING ADAPTIVE RESHAPER DIRECTION

(71) Applicant: INTERDIGITAL VC HOLDINGS, INC., Wilmington, DE (US)

(72) Inventors: Pierre Andrivon, Liffre (FR); Christophe Chevance, Brece (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 71 days.

(21) Appl. No.: 17/438,057

(22) PCT Filed: Mar. 12, 2020

(86) PCT No.: PCT/US2020/022222
§ 371 (c)(1),
(2) Date: Sep. 10, 2021

(87) PCT Pub. No.: WO2020/185984
PCT Pub. Date: Sep. 17, 2020

(65) Prior Publication Data
US 2022/0191481 A1     Jun. 16, 2022

(30) Foreign Application Priority Data

Mar. 13, 2019  (EP) ..................................... 19305296
Jun. 19, 2019  (EP) ..................................... 19305785

(51) Int. Cl.
*H04N 19/117*     (2014.01)
*G06F 1/03*       (2006.01)
(Continued)

(52) U.S. Cl.
CPC ............. *H04N 19/117* (2014.11); *G06F 1/03* (2013.01); *H04N 19/159* (2014.11); *H04N 19/176* (2014.11); *H04N 19/82* (2014.11)

(58) Field of Classification Search
CPC .. H04N 19/117; H04N 19/159; H04N 19/176; H04N 19/70; H04N 19/82; G06F 1/03
(Continued)

(56) References Cited

U.S. PATENT DOCUMENTS

| 2014/0192862 A1 | 7/2014 | Flynn et al. |
| 2017/0085879 A1 | 3/2017 | Minoo et al. |

(Continued)

FOREIGN PATENT DOCUMENTS

| CN | 107258082 A | 10/2017 |
| CN | 108885783 A | 11/2018 |

(Continued)

OTHER PUBLICATIONS

Francois et al., CE12-Related: In-Loop Luma Reshaping With Approximate Inverse Mapping Function, Document: JVET-M0640, Joint Video Experts Team (JVET) of ITU-T SG 16 WP 3 and ISO/IEC JTC 1/SC 29/WG 11, 13th Meeting: Marrakech, MA, pp. 1-6, Jan. 9-18, 2019.

(Continued)

*Primary Examiner* — Kathleen M Walsh
(74) *Attorney, Agent, or Firm* — CONDO ROCCIA KOPTIW LLP

(57) ABSTRACT

A method and apparatus for performing a forward mapping function or its inverse is implemented through information conveyed in a bitstream to perform mapping. The information can be implemented in a uniform or non-uniform lookup table. A decoder can receive the information and derive the inverse function to be used. In one embodiment, a decoder receives information representative of an inverse (Continued)

mapping function and uses the information to implement an inverse mapping lookup table for intra coded picture portions and can derive a forward mapping lookup table to be used with an inverse mapping lookup table for inter coded picture portions.

19 Claims, 17 Drawing Sheets

(51) Int. Cl.
    *H04N 19/159*     (2014.01)
    *H04N 19/176*     (2014.01)
    *H04N 19/82*     (2014.01)

(58) Field of Classification Search
    USPC .................................................. 375/240.02
    See application file for complete search history.

(56) References Cited

U.S. PATENT DOCUMENTS

| | | | |
|---|---|---|---|
| 2018/0035015 A1 | 2/2018 | Yannick et al. | |
| 2018/0124399 A1* | 5/2018 | Su | H04N 19/30 |
| 2019/0110054 A1 | 4/2019 | Su et al. | |
| 2020/0267392 A1* | 8/2020 | Lu | H04N 19/82 |
| 2021/0211738 A1* | 7/2021 | Yin | H04N 19/136 |
| 2022/0150481 A1* | 5/2022 | Kim | H04N 19/82 |

FOREIGN PATENT DOCUMENTS

| | | |
|---|---|---|
| WO | 2015/095361 A1 | 6/2015 |
| WO | 2018039665 A1 | 3/2018 |

OTHER PUBLICATIONS

Paluri et al., AHG17: Conditional Signaling of ALF and In-Loop Reshaper Model, 14. JVET Meeting, Mar. 19, 2019-Mar. 27, 2019, Geneva, (Joint Video Experts Team (JVET) of ITU-T SG 16 WP 3 and ISO/IEC JTC 1/SC 29/WG11, Document: JVET-N0290.

Lu et al., CE12-Related: Universal Low Complexity Reshaper for SDR and HDR Video, Document: JVET-L0247, Joint Video Experts Team (JVET) of ITU-T SG 16 WP 3 and ISO/IEC JTC 1/SC 29/WG 11, 12th Meeting: Macao, CN, pp. 1-10, Oct. 3-12, 2018.

Chen et al, JVET-M1002-v1, "Algorithm description for Versatile Video Coding and Test Model 4 (VTM 4) clause 3.7.3—Luma Mapping with chroma scaling (LMCS)", Joint Video Experts Team (JVET) of ITU-T SG 16 WP 3 and ISO/IEC JTC 1/SC 29/WG 11, 13th Meeting: Marrakech, MA, Jan. 9-18, 2019, 60 pages.

Lu et al, JVET-M0427v2 "CE12: Mapping functions (test CE12-1 and CE12- 2)", Joint Video Experts Team (JVET) of ITU-T SG 16 WP 3 and ISO/IEC JTC 1/SC 29/WG 11, 13th Meeting: Marrakech, MA, Jan. 9-18, 2019, 15 pages.

CN 108885783 A US 20190110054 A1.

* cited by examiner (a)

(b)

IN-LOOP RESHAPING ADAPTIVE RESHAPER DIRECTION

CROSS REFERENCE TO RELATED APPLICATIONS

This application is the National Stage Entry under 35 U.S.C. § 371 of Patent Cooperation Treaty Application No. PCT/US2020/022222, filed Mar. 12, 2020, which claims priority from European Patent Application No. 19305296.6, filed Mar. 13, 2019, and European Patent Application No. 19305785.8, filed Jun. 19, 2019, the contents of which are hereby incorporated by reference herein in their entireties.

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. Mapping and inverse mapping processes can be used in an encoder and decoder to achieve improved coding performance. Indeed, for better coding efficiency, signal mapping may be used. Mapping aims at better exploiting the samples codewords values distribution of the video pictures.

SUMMARY

Drawbacks and disadvantages of the prior art may be addressed by the general aspects described herein, which are directed intra prediction mode partitioning in encoding and decoding.

According to a first aspect, there is provided a method. The method comprises steps for inserting parameters in a bitstream of compressed video data, said parameters representative of an in-loop reshaping filter that operates on prediction data; and, encoding blocks of video data using the prediction data for inclusion with said parameters in said bitstream.

According to a second aspect, there is provided a method. The method comprises steps for receiving parameters in a bitstream of compressed video data, said parameters representative of an in-loop reshaping filter that operates on reconstructed data; and, decoding blocks of video data using said reconstructed data and the parameters from said bitstream.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and relate to video compression and video encoding and decoding. The invention can apply generically to coded video content (e.g. Standard Dynamic Range (SDR), High Dynamic Range (HDR)), but it is particularly applicable when mapping and inverse mapping processes are used in the encoder and decoder to achieve improved coding performance. Indeed, for better coding efficiency, signal mapping may be used. Mapping aims at better exploiting the samples codewords values distribution of the video pictures. The mapping and inverse mapping can be out of the decoding loop. In this case the mapping directly applies to the input samples of the encoder, prior to the core encoding. The inverse mapping process applies at decoder side to the output samples from the decoder. The mapping and inverse mapping can also be in the decoding loop, as proposed in a first JVET (Joint Video Experts Team) contribution.

Figure 1:
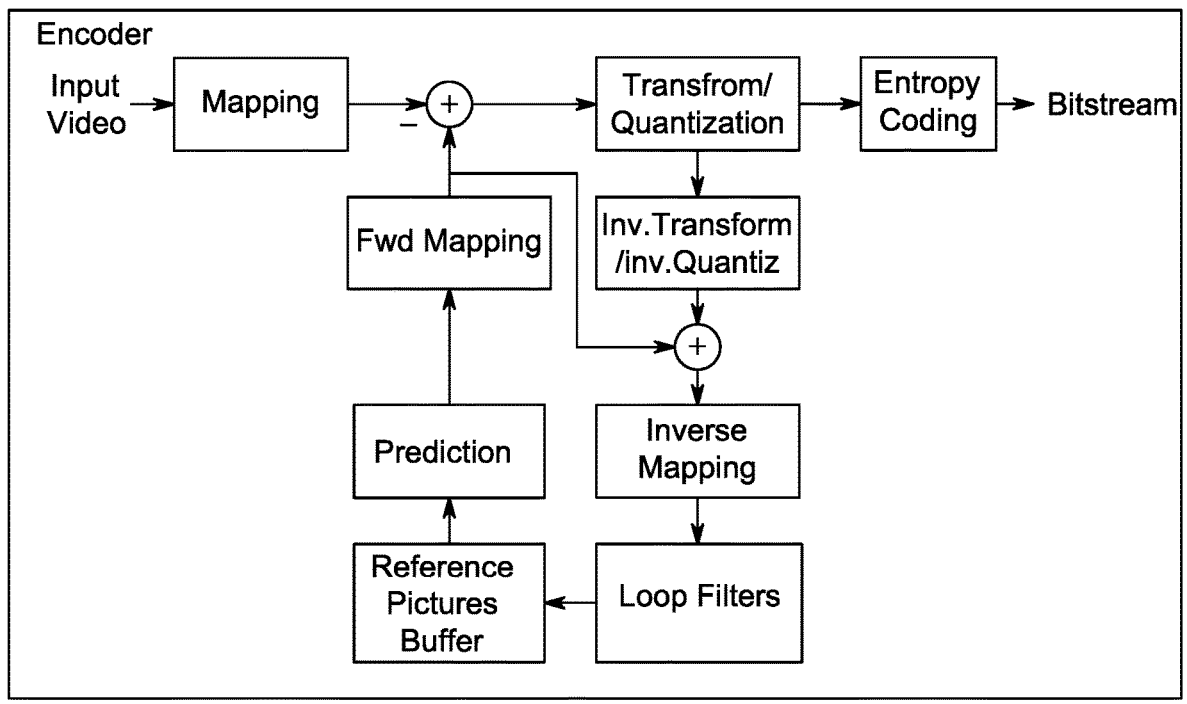
FIG. 1 shows in-loop reshaping of a prediction signal for (a) encoder and (b) decoder.
Figure 1:
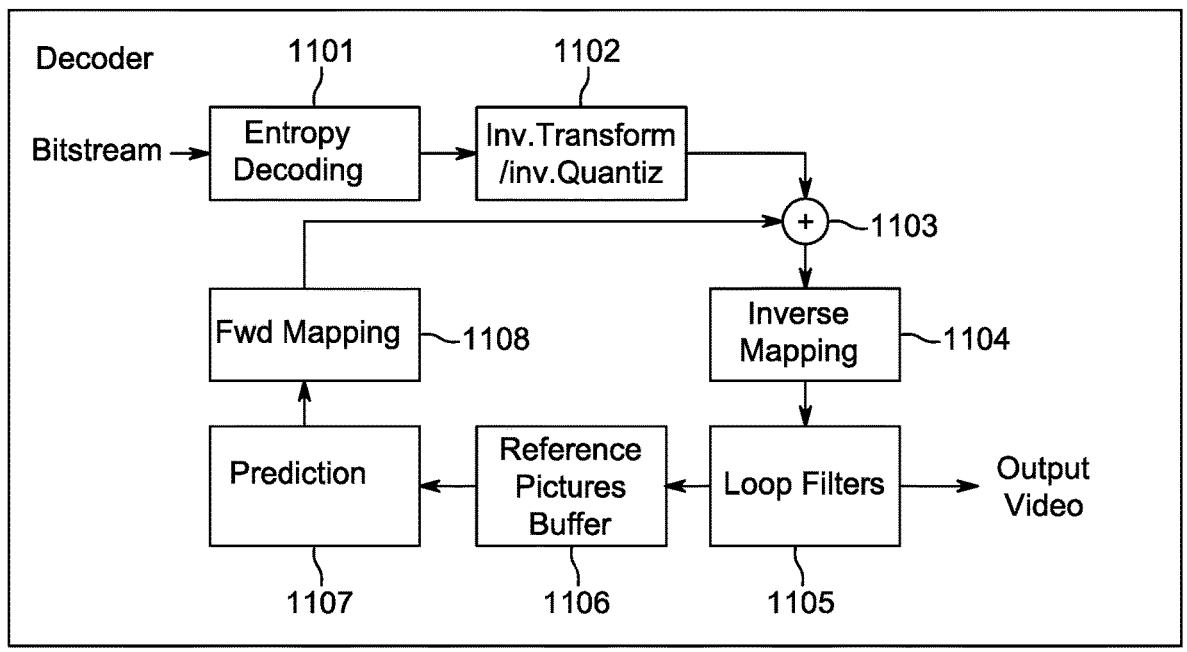

This contribution and a second describe in-loop reshaping solutions to improve coding efficiency. In these solutions, a mapping (reshaping) of the luma or chroma signal is achieved internally to the coding loop. The reshaping applies to the prediction/reconstruction signal, and in the encoder or decoder, additional blocks of reshaping and inverse reshaping are added to the conventional encoder and decoder block diagrams. This is illustrated in FIG. 1 where the reshaping is applied to the prediction luma or chroma signal. It is noted that reshaping is informatively documented in JVET document, "Algorithm description for Versatile Video Coding and Test Model 4 (VTM 4)) clause 3.7.3—Luma mapping with chroma scaling (LMCS)".

At the encoder, the residual signal before quantization, Res_source, is generated according to the following formula:

$$\text{Res\_source}(p) = \text{map}[\text{Orig}(p)] - \text{map}[\text{Pred}(p)] \quad (\text{eq. 1})$$

where Orig(p) is the value of the source sample (to be coded) at location p(x,y) in the picture, Pred(p) is the value of the prediction sample, and Res_source(p) is the value of the prediction residual sample before quantization, map[.] is the reshaping function.

Res_source(p) is then transformed, quantized. The inverse quantized and inverse transformed residual signal is noted Res(p).

At the decoder, the signal is reconstructed according to the following formula (shown in FIG. 1(b)):

$$\text{Rec}(p) = \text{invmap}[\text{map}[\text{Pred}(p)] + \text{Res}(p)] \quad (\text{eq. 2})$$

Preferably implemented in 3 steps:

Step 1108:

$$\text{Rec0}(p) = \text{map}[\text{Pred}(p)] \quad (\text{eq. 3})$$

Step 1103:

$$\text{Rec1}(p) = \text{Rec0}(p) + \text{Res}(p) \quad (\text{eq. 4})$$

Step 1104:

$$\text{Rec}(p) = \text{invmap}[\text{Rec1}(p)] \quad (\text{eq. 5})$$

where Rec(p) is the value of the reconstructed sample, invmap[.] is the inverse reshaping function (inverse of map[.] such that invmap[map[x]]=x). In the aforementioned JVET contributions, this process is performed for each sample of the processed blocks. The functions of mapping and inverse mapping are global to the entire picture, or to areas of the picture. Among the different blocks of the picture or of the areas of blocks, the same functions are used.

The mapping function implementation in the aforementioned JVET contributions are based on a scaling table, scale[k], k=0 to N−1, N being a power of 2 (typically 16 or 32). Each scale applies to a range of luma values. The range R is fixed and power of 2 ($R=2^K$), and is equal to the full luma range (rangeY) divided by N. For instance, for a 10-bit luma signal, and for N=16, R=1024/N=64=$2^6$ (K=6). The mapping function FwdMap is conceptually defined as follows:

FwdMap[0]=0

Then, values at each k*R index, for k=0 to N, is computed, as follows:

FwdMap[(k+1)*R]=FwdMap[k*R]+R*scale[k]

The intermediate values at indices x=(k*R+1) to ((k+1)*R−1), are linearly interpolated from their surrounding values FwdMap[(k+1)*R] and FwdMap[k*R] as follows:

FwdMap[x]=FwdMap[k*R]+(x−k*R)*(FwdMap[(k+1)*R]−FwdMap[k*R])/R

Figure 2:
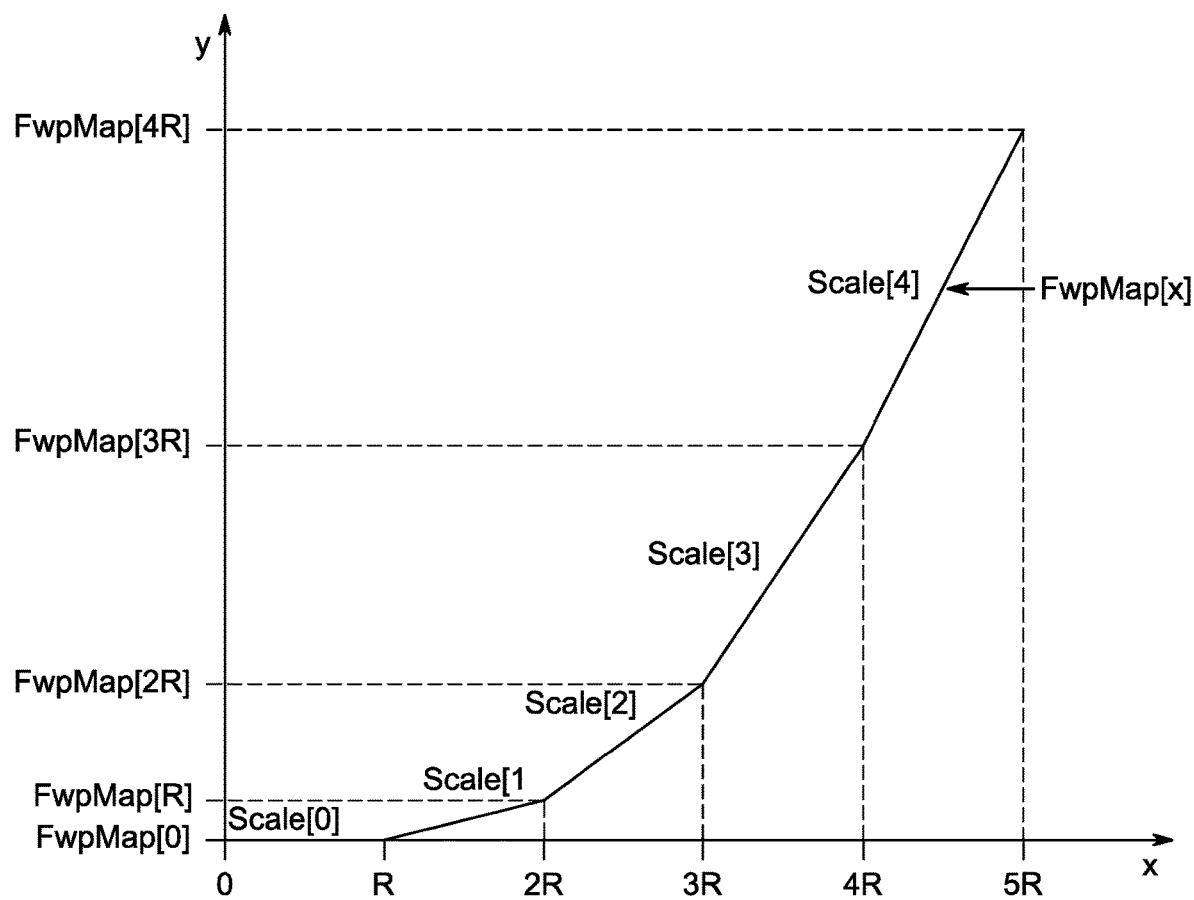
FIG. 2 shows construction of an example forward mapping function.

Note that this process requires that the LUT FwdMap has (rangeY+1) elements, from Y=0 to rangeY, even if the actual maximum sample value Y is equal to (rangeY−1). The process is illustrated in FIG. 2. Each scale is associated with a segment of the piece-wise linear mapping function. Each segment is specified on a luma range of same length (R).

The advantage of using intervals with uniform sampling (same interval length), of length R, is that the mapping of a sample value Y can be easily performed on-the-fly by a simple access to look-up-tables of limited size (size N), using an index computed from the value Y shifting by K bits. This process is conceptually as follows:

Computation of the index k=Y/R=Y>>K

Ymap=scale[k]*Y+A[k]

where A is a pre-built look-up-table of size (N+1), derived as follows (for k=0 to N):

A[k]=FwdMap[k*R]−k*R*scale[k]

The current core syntax is as follows, based on the second JVET contribution:

|  | Descriptor |
| --- | --- |
| tile_group_reshaper_model ( ) { |  |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { |  |
|     reshape_model_bin_delta_abs_CW [ i ] | u(v) |
|     if ( reshaper_model_bin_delta_abs_CW[ i ] ) > 0 ) |  |
|       reshaper_model_bin_delta_sign_CW_flag[ i ] | u(1) |
|   } |  |
| } |  | where:
- reshaper_model_min_bin_idx is representative of the abscise (x) from which the scale[i] on FIG. 2 are carried in the bitstream.
- reshaper_model_delta_max_bin_idx is representative of the abscise (x) until which the scale[i] on FIG. 2 are carried in the bitstream. This is coded relatively to reshaper_model_min_bin_idx.
- reshaper_model_bin_delta_abs_cw_prec_minus1 is representative of the number of bits used to code scale[i] or FwdMap[i] on FIG. 2.
- reshape_model_bin_delta_abs_CW[i] is representative of the absolute scale[i] or FwMap[i] on FIG. 2.
- reshaper_model_bin_delta_sign_CW_flag[i] is representative of the sign of scale[i] or FwdMap[i] on FIG. 2.

The forward mapping function FwdMap may be quite straightforward to apply but it requires to carry in the bitstream a certain number of pivot points representative of piece-wise linear (PWL) sections for which there is no flexibility on the size of each section as the forward mapping lookup table (LUT) reconstruction process (in case of LUT precomputation prior to processing the remapping sample-wise) or the on-the-fly reconstruction operates on 16 PWL with uniform sampling. Additionally, the first stage consists of determining the section in which the sample is to be remapped (although this may be a simple shift operation).

Figure 3:
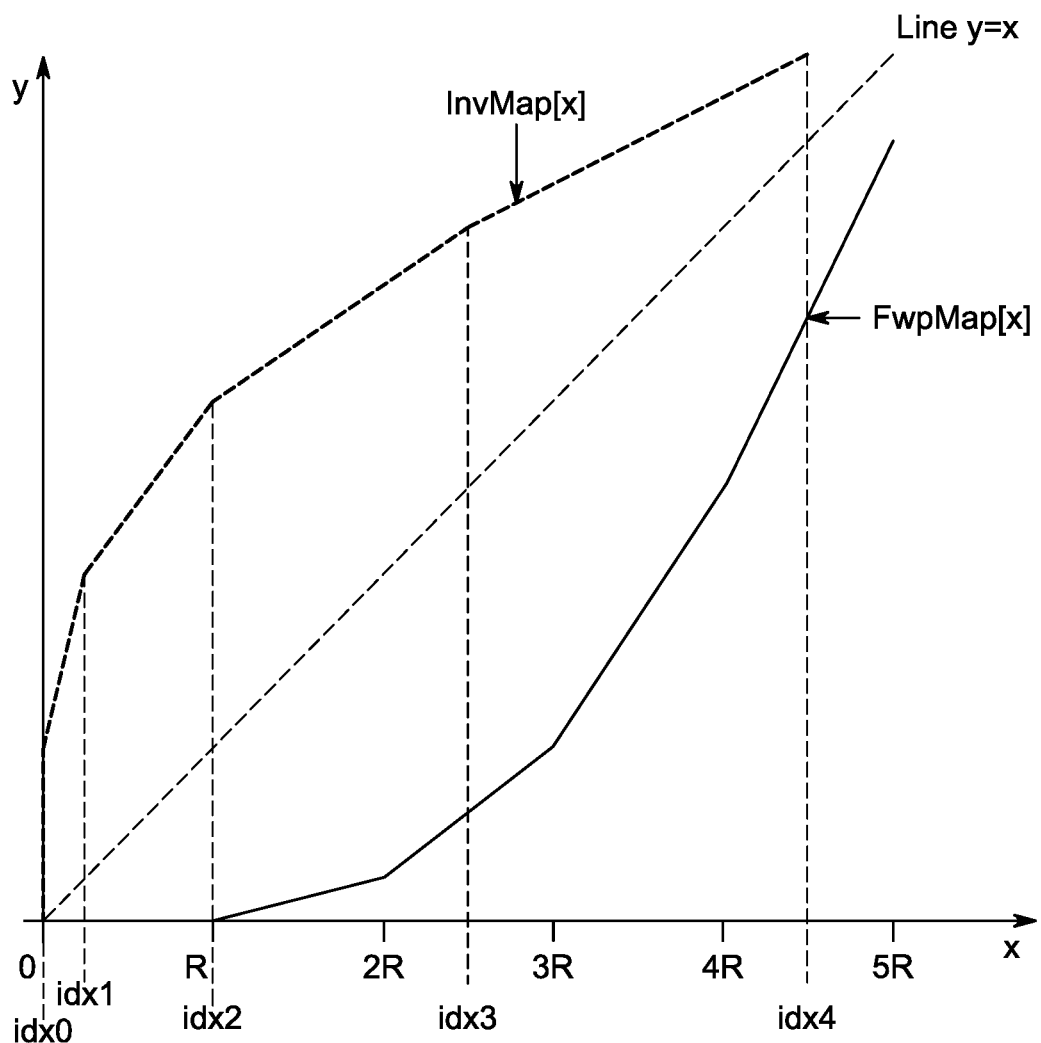
FIG. 3 shows construction of an example inverse mapping function.

Besides, the inverse mapping function InvMap is built as the inverse of the Forward mapping function. It is mathematically built as the symmetric function of FwdMap related to the line defined by y=x, as illustrated in FIG. 3. An issue with such inverse mapping is that it cannot be applied on-the-fly as easily as the forward mapping. Indeed, even if the inverse mapping function remains piece-wise linear, the identification of the index of the piece which a value Y belongs to is not straightforward. Contrarily to the forward mapping case, where a simple shifting operation is required, here this is more complicated because the indices of the pieces of the inverse mapping function are not multiple of a pre-defined length that is power of 2. This is illustrated in FIG. 3 where the indexes of the pieces of the inverse mapping functions ($idx_0$ to $idx_4$) are not uniformly distributed along the horizontal axis since by design $idx_k$=fwpMap[k*R]. This operation of index finding is known as "binary search" and is of complexity $O(\log 2(n))$.

Figure 4:
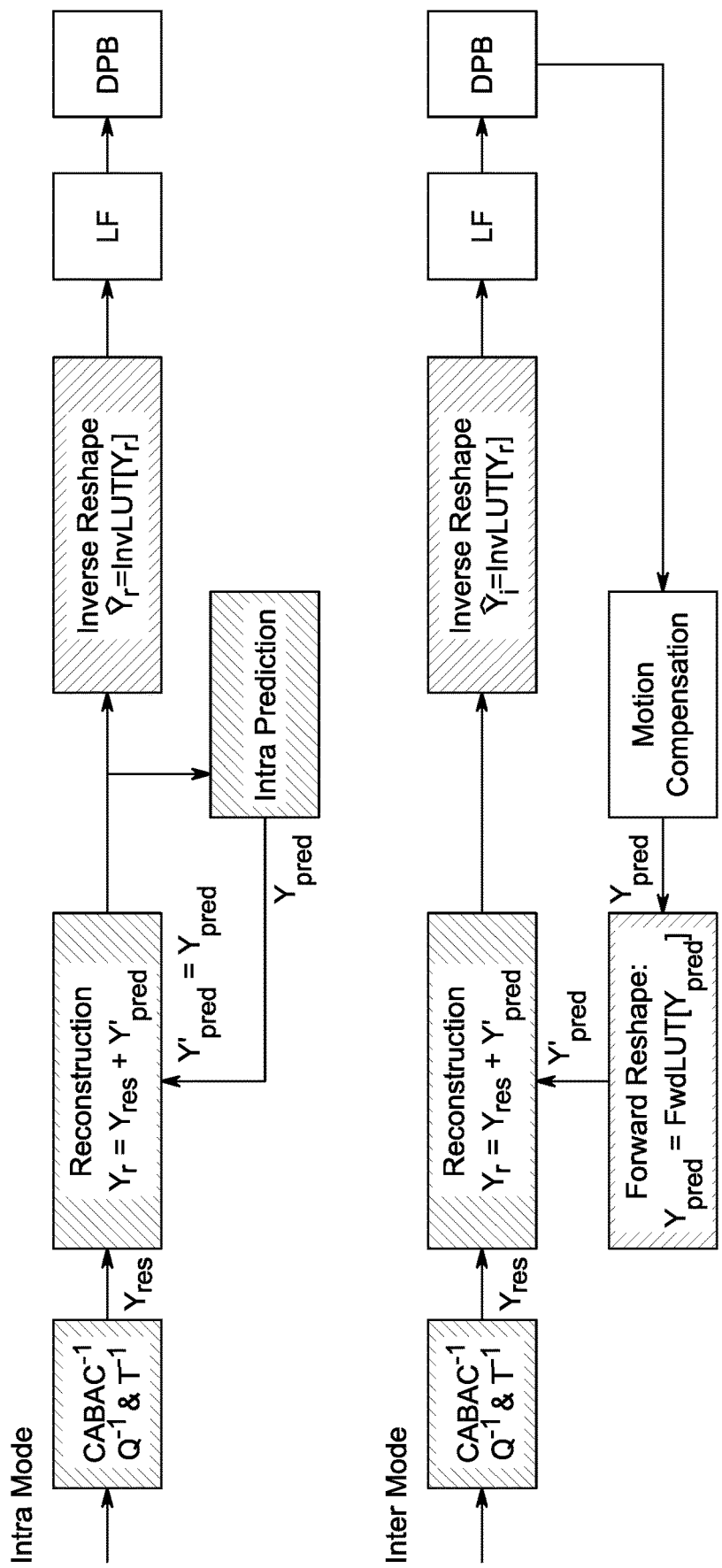
FIG. 4 shows an example of use of inverse and forward reshaping in a hybrid decoder.
Figure 5:
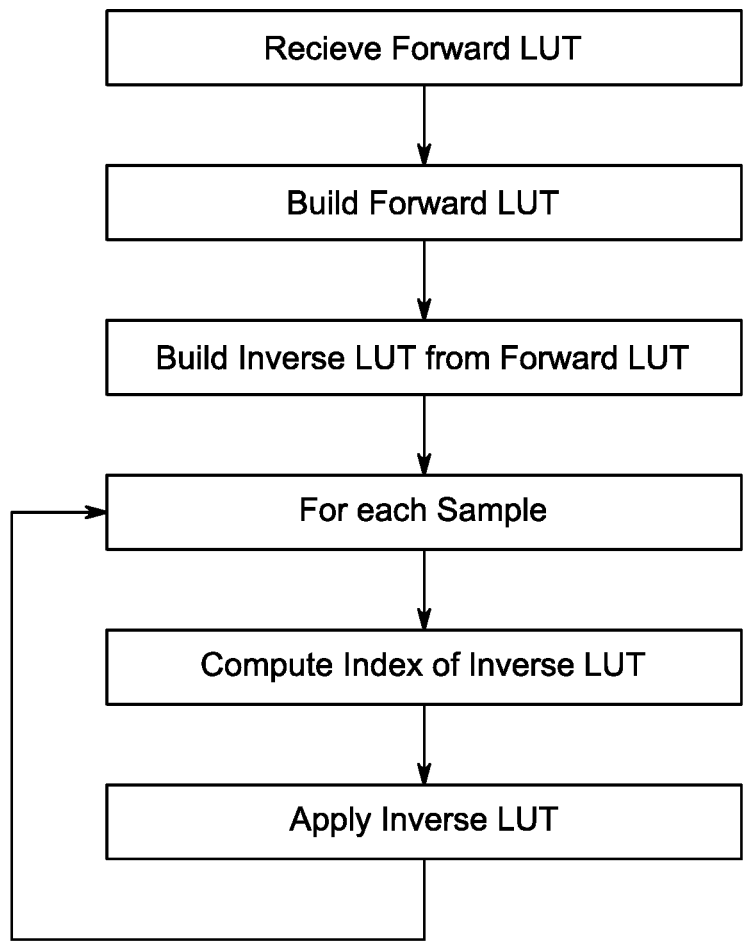
FIG. 5 shows an example of in-loop reshaping decoding process for intra pictures.

From the following scheme of the second aforementioned JVET contribution, one can see that as far as intra mode prediction is concerned, only the inverse reshaper is used in the decoder (see FIG. 4).

This means that in the current implementation for each intra picture or to some extent in an all intra profile, a forward in-loop reshaping curve is carried, then after a binary search has been operated a revert is required. This stands for extra computation and additional complexity.

Several simplifications of the in-loop reshaping have already been proposed.

A prior proposal proposes to simplify the inverse reshaping design by enforcing the inverse look-up table to be built from an equi-length (uniform sampling) piece wise linear model. The inverse LUT is either computed at the decoder, then approximated by the equi-length PWL, or the equi-length is explicitly signaled in the stream.

That proposal aims at simplifying the inverse mapping process, by converting the inverse mapping function to a piece-wise linear function with equi-length intervals, with a length at power of 2. Hence, it will be possible to perform the inverse mapping on-the-fly by a simple process, as for the forward mapping. The techniques can apply generically to coded video content (e.g. SDR, HDR), but it is particularly applicable when mapping and inverse mapping processes are used in the encoder and decoder to achieve improved coding performance.

Advantageously, this process may enable a simple implementation of the per-sample inverse mapping process, using simple shifting operations and access to look-up tables of a limited size (e.g. below 64 elements). Thus, the proposed techniques may simplify the design of the inverse mapping process while preserving most of the potential coding gains from reshaping (i.e., mapping, inverse mapping of the signal).

Figure 10:
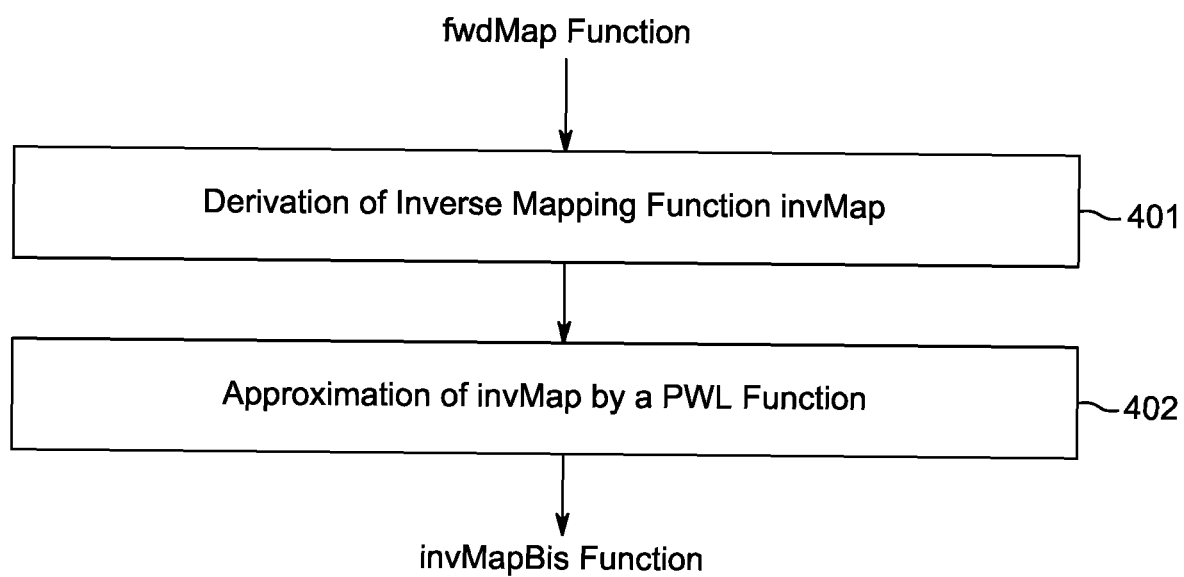
FIG. 10 shows a process of inverse mapping function simplification.

The process of inverse mapping function generation according to an embodiment is illustrated in FIG. 10. It uses as input the data characterizing the forward mapping function. This can be made of the function fwdMap, or of the scaling table scale[ ]. From this input data, the inverse mapping function invMap is built in step 401. This can be achieved by a mathematical symmetry related to the line y=x, of the forward mapping function fwdMap. An approximation of the inverse mapping function invMap is generated in step 402. This approximation can use a piece-wise linear model of the function, where each piece is defined per equi-length interval, the intervals being of same length equal to a power of 2.

In another embodiment of the prior proposal, the approximate inverse mapping function is derived at the decoder. The number of pieces of the function is signaled in the bitstream. This is indicated in the syntax table below (in italics).

|  | descriptor |
|---|---|
| reshaper_model( ) { |  |
|   slice_reshaper_model_present_flag | u(1) |
|   if (slice_reshaper_model_present_flag) { |  |
|     reshaper_model_min_bin_idx | u(v) |
|     reshaper_model_max_bin_idx | u(v) |
|     reshaper_model_bin_delta_abs_cw_prec_minus1 | u(v) |
|     for (i= reshaper_model_min_bin_idx; i<= reshaper_model_max_bin_idx; i++) { |  |
|       reshape_model_abs_CW | u(v) |
|       reshape_model_sign_CW | u(1) |
|       reshapeModelScale[ i ] = reshape_model_abs_CW * (1 |  |
|       − 2* reshape_model_sign_CW) |  |
|     } |  |
|     *reshaper_model_inv_log2_size* | *u(2)* |
|   } |  |
| } |  |

The rest of the syntax corresponds to the signaling of the forward mapping function. A new syntax element, reshaper_model_inv_log2_size, is introduced to specify the number of pieces of the inverse mapping function. Referring to the notations used, M is derived as follows:

$$M=2^{reshaper\_model\_inv\_log2\_size}=$$
(1<<reshaper_model_inv_log2_size)

In another embodiment, this parameter is a factor to be applied to the number of pieces N used to model the forward mapping function:

$$M=N*2^{reshaper\_model\_inv\_log2\_size}=$$
(N<<reshaper_model_inv_log2_size)

The value of the number of pieces (M) is determined at the encoder. For example, it can be determined in order to guarantee that the distortion mentioned above is below a given threshold (e.g. $T*rangeY^2$, with T=0.02). This can be achieved iteratively, starting with M=N. The approximate inverse mapping function is generated with this value M. If the distortion obtained with the resulting approximate inverse mapping function is above the threshold (T*rangeY$^2$), M is doubled (M is set to (M*2)) and the process is re-iterated, until the distortion dist is below the threshold (T*rangeY$^2$), or until M reaches a maximum value Mmax (e.g. 128). Alternatively, M can be set arbitrarily based on practical experiments. A value of 32 is in many cases relevant.

From the number of pieces (M), the approximate inverse function can be derived at the decoder as described.

In another embodiment of the prior proposal, the approximate inverse mapping function is explicitly signaled in the stream. This is indicated in the syntax table below (in italics). The rest of the syntax corresponds to the signalling of the forward mapping function and is known.

|  | descriptor |
|---|---|
| reshaper_model( ) { |  |
|   slice_reshaper_model_present_flag | u(1) |
|   if (slice_reshaper_model_present_flag) { |  |
|     reshaper_model_min_bin_idx | u(v) |
|     reshaper_model_max_bin_idx | u(v) |
|     reshaper_model_bin_delta_abs_cw_prec_minus1 | u(v) |
|     for (i= reshaper_model_min_bin_idx; i<= reshaper_model_max_bin_idx; i++) { |  |
|       reshape_model_abs_CW | u(v) |
|       reshape_model_sign_CW | u(1) |
|       reshapeModelScale[ i ] = reshape_model_abs_CW * (1 − 2* reshape_model_sign_CW) |  |
|     } |  |
|   } |  |
|   *reshaper_model_inv_log2_size* | *u(2)* |
|   *reshaper_model_inv_offset* | *u(2)* |
|   *for (i= 0; i<= reshaperModelInvSize ; i++) {* |  |
|     *reshape_model_abs_CW* | *u(v)* |
|     *reshape_model_sign_CW* | *u(1)* |
|     *reshapeModelInvScale[ i ] = reshape_model_abs_CW * (1 − 2* reshape_model_sign_CW)* |  |
|   *}* |  |
| } |  |

At the encoder side, the table invScale, its size M and the first value of invMapBis (invMapBis[0]) are derived from the forward mapping function fwdMap. This is typically achieved according to the process described above, for example, by 1) deriving the inverse mapping function invMap from the forward mapping function fwdMap, 2) generating the approximate inverse mapping function invMapBis from the inverse mapping function invMap (in this step, M can be arbitrarily chosen, or adaptively computed as described above), 3) deriving the table invScale from the approximate inverse mapping function invMapBis. invMapBis is used to perform the inverse mapping in the encoder. Then the encoder encodes in the bitstream the parameters characterizing the approximate mapping function, that is, M, invMapBis[0], the table invScale, following the syntax described in the table.

At the decoder side, the parameters characterizing the approximate inverse mapping function are decoded from the bitstreams, following the syntax described in the table. The approximate inverse mapping function invMapBis is then derived from those parameters. invMapBis is used to perform the inverse mapping in the decoder. Alternatively, invMapBis does not need to be built, and the inverse mapping is performed on-the-fly as described in section "Simplified on-the-fly inverse mapping".

The main drawback of this prior approach is the degradation of the coding efficiency, because the approximated inverse LUT induces more reconstruction errors or drifts because the concatenation of the forward LUT with the approximated inverse LUT is less close to the identity function than when using the non-approximated inverse LUT.

The alternate track to reduce the complexity of the in-loop reshaping is to strongly limit the number of pieces used to model the forward and inverse LUTs (typically 8 instead of 16 or 32). This can therefore reduce the number of checks to be done to identify the piece which a luma value belongs to when performing the on-the-fly inverse mapping. But this has obviously negative impact on the coding efficiency.

Under the general aspects described here, the following solution is proposed to reduce the complexity of the inverse reshaping processes by carrying either pivot points representative of the forward in-loop-reshaping curve or of the inverse one. Typically, pivot points representative of only an inverse in-loop reshaping curve (pre-computed at the encoder) is directly conveyed in the bitstream for intra predicted pictures, and pivots points representative of a forward in-loop reshaping are carried in the bitstream associated with non-intra pictures. Different means to retrieve the forward and corresponding inverse in-loop reshaping (mapping) function are documented below.

Figure 6:
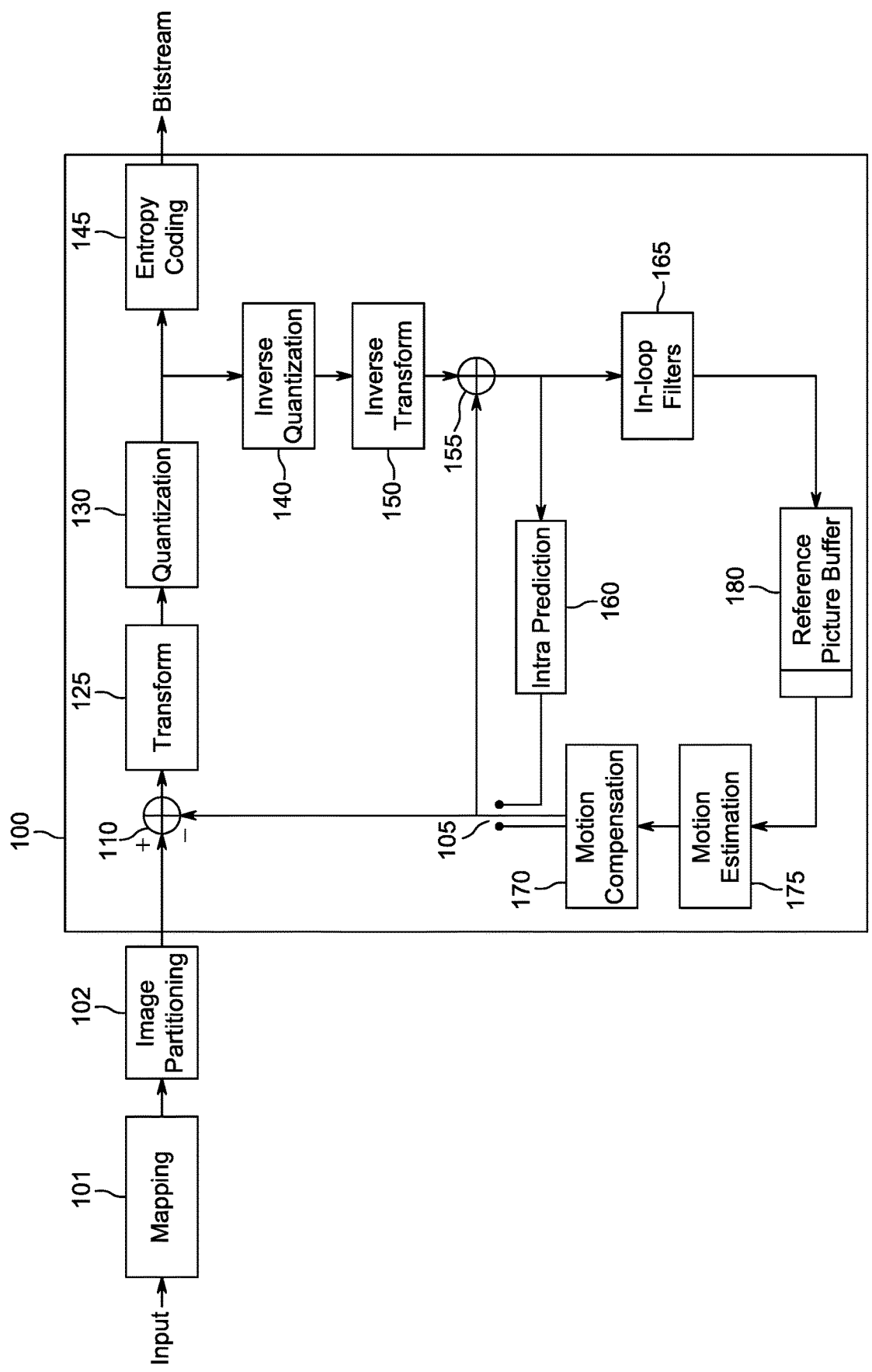
FIG. 6 shows a generic video compression encoder.
Figure 7:
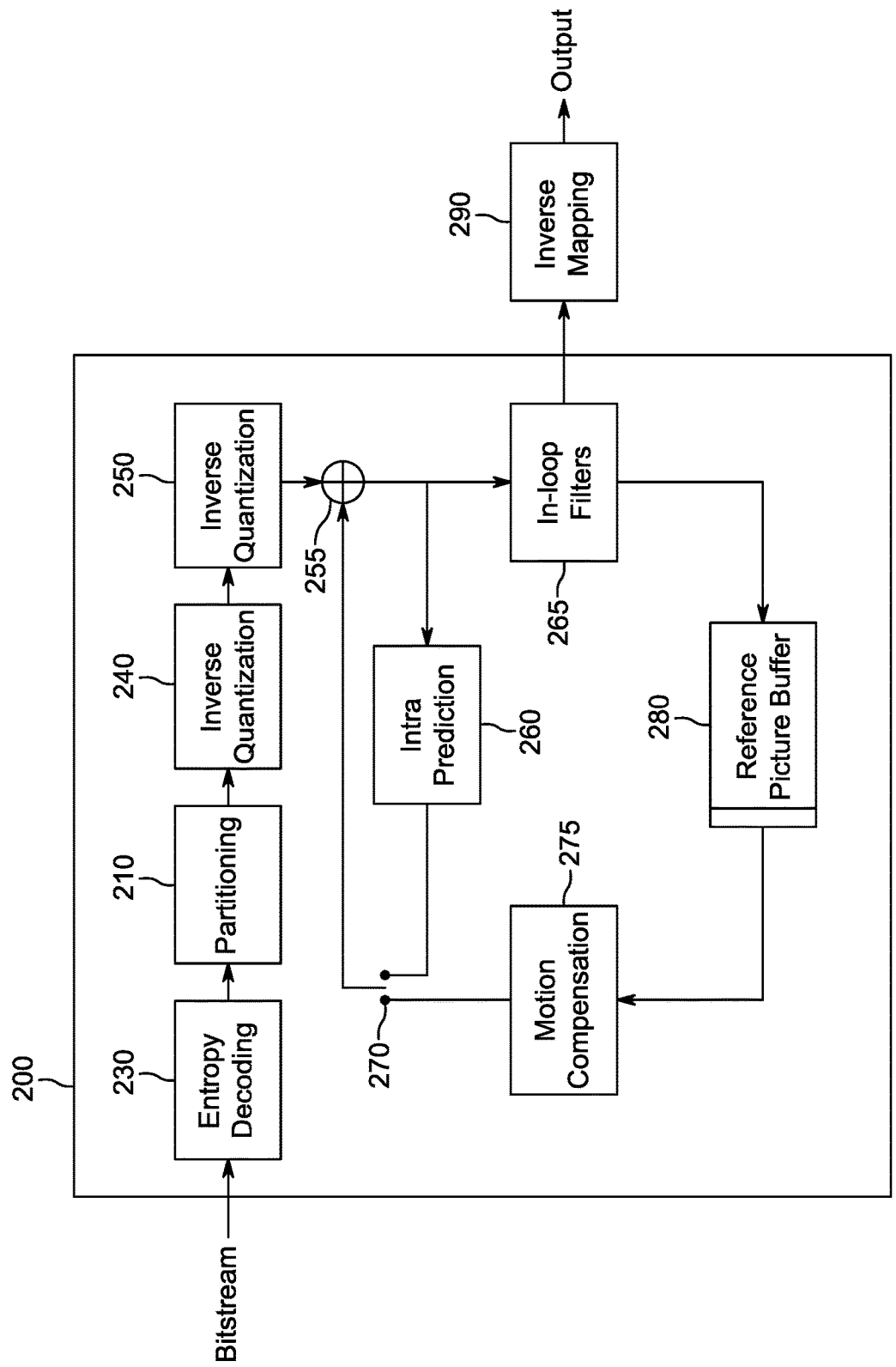
FIG. 7 shows a generic video decompression decoder.

The codec modules of FIG. 6 that are affected are placed after the prediction (160, 170, 175, 275), according to the variants of the invention. A step prior to loop filtering (165,265) can also be added.

One main idea is to signal either forward or inverse LUT (representative of the in-loop reshaping curve). Embodiments may differ in implementation. In the following uniform LUT means a LUT whose input entries are sampled uniformly. The term "LUT direction" stands for qualifying whether the transmitted in-loop reshaping curve is forward or inverse. The main advantage is to simplify inverse reshaping computation for intra coded pictures or intra slices/tiles.

The common characteristic in the invention is that either inverse or forward in-loop reshaping curve parameters are carried at a same time. Different implementations with regards to the mutual behavior of forward and inverse LUT are described.

Figure 10B:
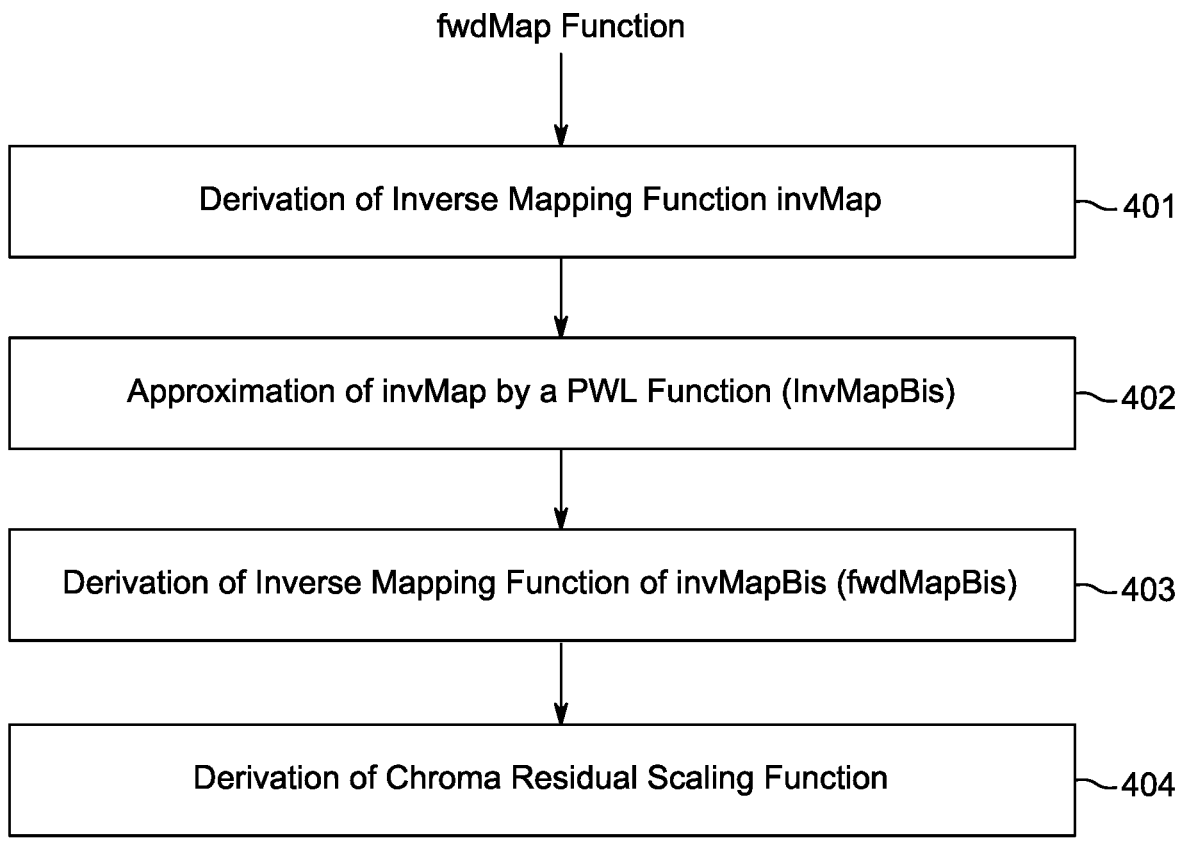
FIG. 10b shows one embodiment of an encoding method of inverse mapping function simplification.

In one embodiment, a uniformly sampled reshaping lookup table (LUT) is carried and an indicator indicates that said carried LUT is an inverse LUT. FIG. 10*b*, implements the same two first stages as described in the prior art (steps 401 and 402). Step 403 corresponds to the derivation of a non-uniformly sampled forward reshaping LUT from uniformly sampled inverse reshaping LUT. Step 404 is the derivation of the chroma residual scaling LUT from the uniformly sampled inverse reshaping LUT according to embodiments described below.

Advantageously, uniformly sampled inverse reshaping LUT is carried with corresponding intra coded pictures/slices/tiles. The non-uniformly sampled forward reshaping LUT is derived from the uniformly sampled inverse reshaping LUT for use with inter coded pictures/slices/tiles.

Typically, a non-uniformly sampled inverse reshaping LUT InvMap is computed by the encoder from uniformly sampled forward reshaping LUT FwdMap such as documented in the prior proposal. Then InvMapBis, a uniformly sampled version of InvMap is generated following a uniform regression such as documented in the prior proposal. Eventually, FwdMapBis is derived as the inverse of InvMapBis and represents a non-uniformly sampled forward reshaping LUT (step 403 of FIG. 10b).

Typically, the number of pivot points carried is the same as the one used for FwdMap (8 or 16).

As an example, the syntax of prior art is changed so as to add the signalling of the nature of the carried LUT i.e. inverse or forward. One proposed syntax is:

|  | Descriptor |
|---|---|
| tile_group_header ( ) { | |
| ... | |
| tile_group_reshaper_model_present_flag | u(1) |
| if(tile_group_reshaper_model_present_flag) { | |
| tile_group_reshaper_direction_flag | u(1) |
| reshaper_min_bin_idx | ue(v) |
| reshaper_delta_max_bin_idx | ue(v) |
| reshaper_delta_cw_prec_minus1 | ue(v) |
| for ( i = reshaper_min_bin_idx; i <= LmcsMaxBinIdx; i++ ) { | |
| reshaper_delta_abs_cw[ i ] | u(v) |
| if ( reshaper_delta_abs_cw[ i ] ) > 0 ) | |
| reshaper_delta_sign_cw_flag[ i ] | u(1) |
| } | |
| } | |
| } | |

When set to 0, tile_group_reshaper_direction_flag indicates that the carried LUT is representative of a forward LUT. When set to 1, it indicates that the carried LUT is representative of an inverse LUT.

Advantageously, reshaper_min_bin_idx semantics is adjusted compared to prior art. When tile_group_reshaper_direction_flag is set to 0, it represents the carried minimum bin index of the carried forward LUT (same as prior art). When tile_group_reshaper_direction_flag is set to 1, it represents the carried minimum bin index of the carried inverse LUT.

As a variant, reshaper_min_bin_idx semantics is not changed compared to prior art whatever the value of tile_group_reshaper_direction_flag. In that case, when tile_group_reshaper_direction_flag is set to 1, the minimum bin index of the carried inverse LUT is determined as being a fixed number. For example, this fixed number is 0 i.e. the minimum bin index of the carried inverse LUT is set equal to 0. Additionally, (when tile_group_reshaper_direction_flag is set to 1), reshaper_min_bin_idx may be representative of an ordinate value offset (y-offset) to be applied at the origin of the inverse LUT i.e. that the first pivot point representative of the carried inverse LUT may be equal to reshaper_min_bin_idx*OrgCW where, for example, OrgCW=(1<<BitdepthY)/16. OrgCW is representative of the uniform sampling step of the piece-wise linear mapping function. As an example OrgCW=64. BitdepthY is representative of the bitdepth of the content or of the precision of the mapping LUT. As an example, BitdepthY=10.

Advantageously, reshaper_delta_max_bin_idx semantics is adjusted compared to prior art. When tile_group_reshaper_direction_flag is set to 0, it is representative of the carried maximum bin index of the carried forward LUT. When tile_group_reshaper_direction_flag is set to 1, it is representative of the carried maximum bin index of the carried inverse LUT.

Typically, the maximum bin index of the inverse reshaping LUT (reshaperModelMaxBinIdxInv) is derived from the maximum bin index of the forward reshaping LUT (reshaperModelMaxBinIdx) as follows:

reshaperModelMaxBinIdxInv=reshapePivotInv[reshaperModelMaxBinIdx+1]
>>log2PwlInvBinLen where log2PwlInvBinLen is the base 2 of logarithm of the uniform sampling step. As an example, log2PwlInvBinLen is equal to 6. reshapePivotInv[i] is the i-th pivot point constituting the inverse reshaping LUT.

Advantageously, FwdMapBis is clipped so that bounds of InvMapBis and FwdMapBis are matched together or inverse of each other as follows:

for (i=reshapePivotInv[reshaperModelMaxBinIdxInv+1]; i<lutSize;i++)
FwdMapBis[i]=FwdMapBis[reshapePivotInv[reshaperModelMaxBinIdxInv+1]];

where lutSize is equal to the size of FwdMapBis LUT. As an example lutSize=1024.

Reshaping, also known as luma mapping with chroma scaling (LMCS), may also include a Chroma Residual Scaling (CRS) stage. Typically, this stage operates on chroma residues of inter pictures. CRA may as well be applied on intra picture chroma residues for instance when dual intra tree mode is disabled in order to avoid chroma samples availability latency issues. CRS is represented by a chroma scaling LUT. Typically in the prior art, when a forward reshaping LUT is carried, this CRS LUT is computed as the slope of each linear portion constituting said forward LUT.

As an example, the CRS LUT is derived as follows with integer implementation:

```
for (i = 0; i < PIC_CODE_CW_BINS; i++)
{
  if (binCW[i] == 0)
    CRS_LUT[i] = 1 << CSCALE_FP_PREC;
  else
    CRS_LUT [i] = OrgCW * (1 << CSCALE_FP_PREC) / binCW[i]
}
``` where CSCALE_FP_PREC is the precision of the LUT. As an example CSCALE_FP_PREC=11. CRS LUT[i] is the CRS LUT and the index i designates the i-th portion of the abscissa split in PIC_CODE_CW BINS uniform sampling portions. index i=0 starts at 0. PIC_CODE_CW BINS may be equal to 16. binCW[i] represents the difference of ordinate values of the pivot points representative of the reshaping curve. A drawback of this method is that it requires an integer division. Integer implementations prefer shifts.

When an inverse reshaping LUT is carried as proposed, computation of the CRS LUT is simplified because the inverse reshaping LUT slope is computed from uniformly sampled pivot points (step 404 of FIG. 10b).

```
for (i = 0; i < PIC_CODE_CW_BINS; i++)
{
  if (binCW[i] == 0)
    CRS_LUT [i] = 1 << CSCALE_FP_PREC;
  else
    CRS_LUT [i] = (binCW[i] * (1 << CSCALE_FP_PREC) + (1 << (log2PwlInvBinLen
      - 1))) >> log2PwlInvBinLen
}
``` where log2PwlInvBinLen is the base 2 of logarithm of the uniform sampling step. As an example, log2PwlInvBinLen is equal to 6. This implementation is integer implementation friendly.

Advantageously, the computation of the scaling of the chroma residue (CRS_TU) for a Transform Unit (TU) is highly simplified as it relies on the index location of a mapped chroma residue in the inverse reshaping LUT which is uniformly sampled. Consequently, there is no need for binary search when invoking inverse reshaping LUT index localization and the per-pixel computation of the scaling of the chroma residue is performed thanks to a simple right shift operation.

$$CRS\_TU = CRS\_LUT[lumaIdx >> log2PwlInvBinLen]$$

where lumaIdx is representative of the average (mapped) luma in the current TU.

As a variant, a uniformly sampled reshaping LUT is carried and an indicator (flag) indicates whether said carried LUT is an inverse LUT or a forward LUT.

Advantageously, uniform inverse LUT is carried with corresponding intra coded pictures/slices/tiles (i.e. within the same slice/tile/coded picture or with the corresponding active parameter set) while uniform forward LUT is carried at least with the following non-intra (i.e. inter) coded picture. It is noted that the uniform inverse LUT corresponding to intra coded pictures may be derived from a non-uniform forward LUT.

In order to avoid the drawback of the prior proposal, for which the uniform forward LUT and the corresponding uniform inverse LUT are not exactly reciprocal thus begetting important loss in coding gains due to the reconstruction approximation, this embodiment variant proposes that reshaping LUT applies only to the associated coded picture until replaced by a new LUT.

As an example, an inverse reshaping LUT (InvMapBis) is carried with the first intra coded picture (I1). InvMapBis applies to I1. Then, a forward reshaping LUT (FwdMap) is carried with the first non-intra (inter) coded picture (B1) in the decoding order. FwdMap applies to inter mode in B1 and the inverse of FwdMap is computed, inv(FwdMap)=InvMap, which applied to intra mode of B1. InvMapBis may apply to the next all intra coded picture I2 except when a second inverse LUT InvMapBis2 is carried with coded picture I2. Thus, there are inverse LUT dedicated to all intra coded picture, and forward LUT (with derived inverse non-uniform LUT) for inter pictures.

Figure 8:
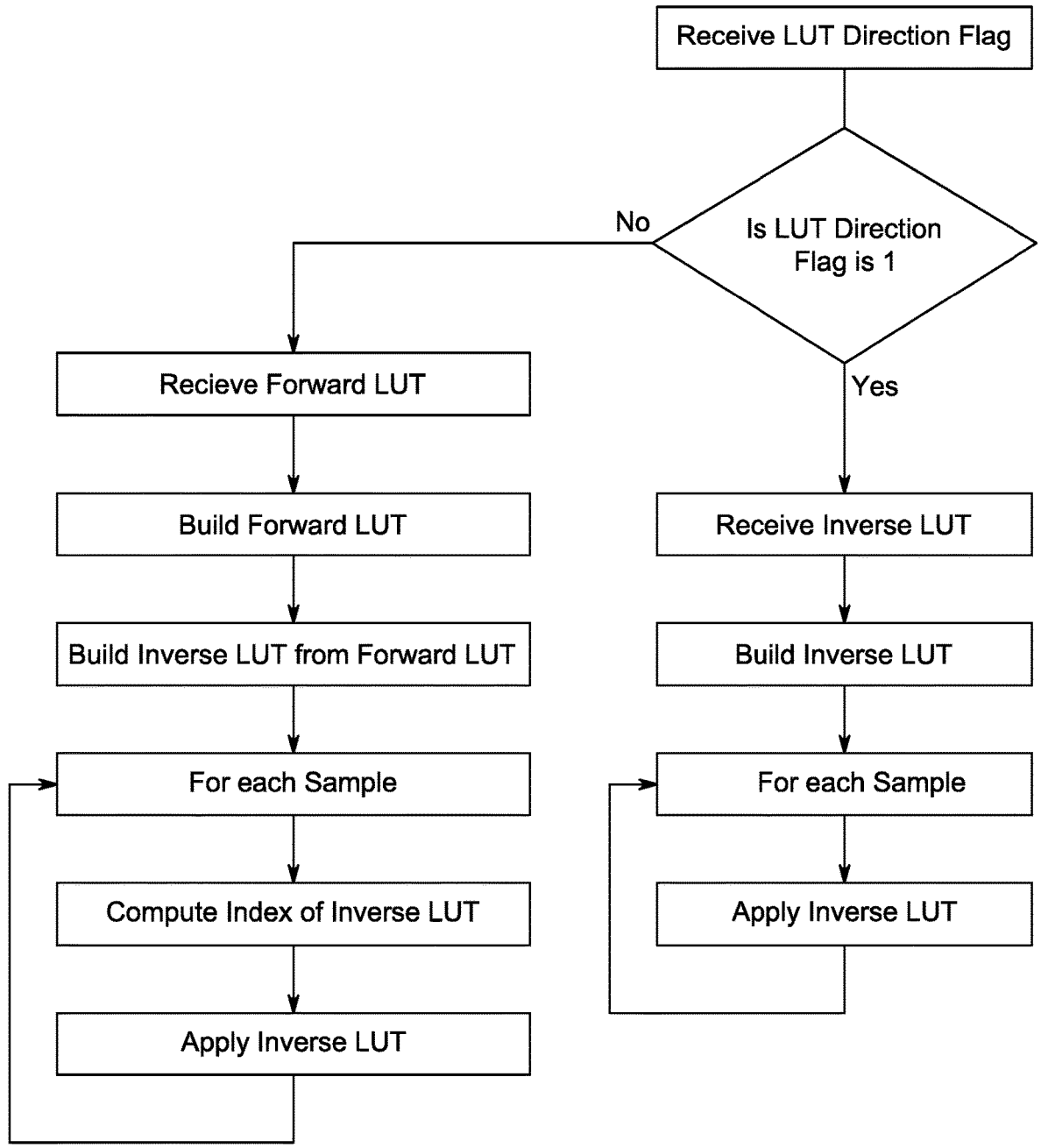
FIG. 8 shows an example of a proposed in-loop reshaping decoding process for intra pictures.
Figure 9:
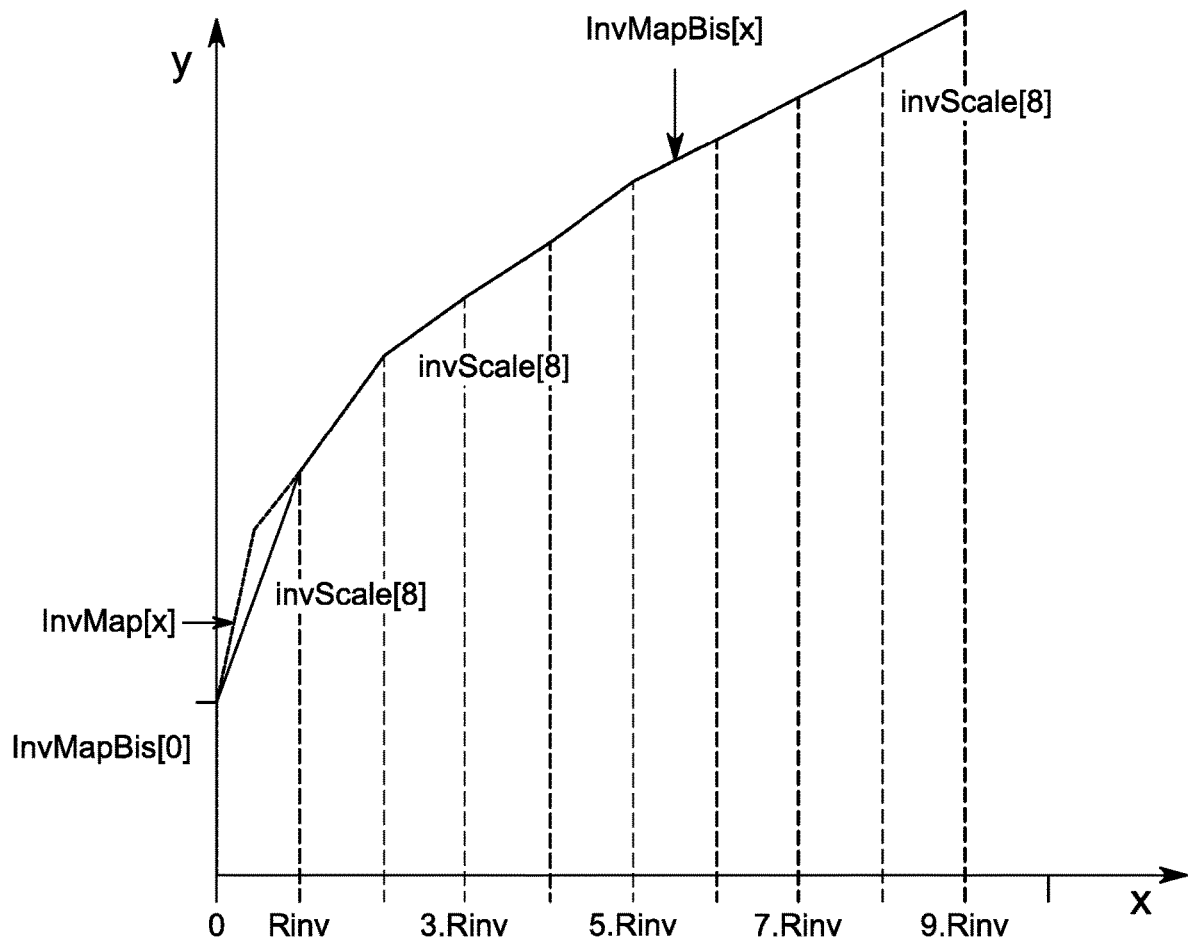
FIG. 9 shows an example of a uniformly sampled inverse reshaping lookup table carried in a bitstream from an encoder.

It is expected in FIG. 8 that the reshape LUT direction flag is set to 1 for intra pictures (0/No, corresponding to the current process) so that the inverse reshaping process is simplified (when compared with the "No" branch). This makes particular sense for all intra bitstreams such as often present in contribution networks or all intra profiles, as employed by high quality prosumer cameras, for example.

Typically, InvMapBis is computed by the encoder from FwdMap as a uniform regression of inv(FwdMap) such as documented in the prior proposal. Typically, the number of pivot points carried is the same as the one used for FwdMap (8 or 16). Unlike the prior proposal, additional precision is not required in this case as the reciprocal is not required in the intra decoding process; besides a non-uniform inverse of InvMapBis may be used as the forward LUT applied at the encoder on intra pictures.

In the case of all intra coded pictures bitstreams (as used in contribution networks), the proposed approach is simpler as only a uniform inverse LUT is carried and directly applied during the decoding of coded intra pictures (on-the-fly computation).

One proposed syntax is:

|  | Descriptor |
| --- | --- |
| seq_parameter_set_rbsp( ) { | |
| ... | |
| sps_reshaper_enabled_flag | u(1) |
| if( sps_reshaper_enabled_flag ) { | |
| sps_reshaper_signal_type | u(2) |
| sps_reshaper_inv_direction_flag | u(1) |
| sps_reshaper_chromaAdj_flag | u(1) |
| } | |
| rbsp_trailing_bits( ) | |
| } | |

When set to 0, sps_reshaper_inv_direction_flag indicates that the carried LUT is representative of a forward LUT. When set to 1, it indicates that the carried LUT is representative of an inverse LUT.

Alternatively, this indicator may be present in a tile_group_header( ) or tile_group_reshaper_model( ).

|  | Descriptor |
| --- | --- |
| tile_group_header( ) { | |
| ... | |
| if( sps_reshaper_enabled_flag) { | |
| tile_group_reshaper_model_present_flag | u(1) |
| if(tile_group_reshaper_model_present_flag ) | |
| tile_group_reshaper_model ( ) | |
| tile_group_reshaper_enable_flag | u(1) |
| if( tile_group_reshaper_enable_flag) { | |
| tile_group_reshaper_inv_direction_flag | u(1) |
| if( sps_reshaper_chromaAdj_flag ) | |
| tile_group_reshaper_chromaAdj_flag | u(1) |
| } | |
| } | |
| byte_alignment( ) | |
| } | |

Typically, the actual LUT is carried in a structure such as tile_group_reshaper_model( ) documented in the second aforementioned JVET contribution.

As a variant, carried inverse LUT is not uniform. This may be advantageous for all intra coded bitstreams, for which the inverse of said carried inverse LUT (i.e. a forward LUT) is not demanded by the intra decoding process (only the index needs to be retrieved with a binary search).

As a variant, carried inverse LUT is inversed in the encoder/decoder to retrieve a corresponding forward LUT (saving transmission of a new forward LUT with next non-intra picture).

It is worth noting that an implicit mode may be derived from previous embodiment where the nature of the reshape LUT (forward or inverse) is inferred from the slice/tile group type which the reshape LUT is associated to. In this variant, the reshape direction flag carried in the SPS or in the tile group is not required.

As an example, when the tile_group_type==I, then an inverse reshape LUT is carried in the tile_group_header. When tile_groupe_type!=I, then a forward reshape LUT is carried in the tile_group_header.

The invention enables reduction of complexity especially for intra coded slices/tiles. Indeed, inverse reshaping LUT is directly provided for such pictures/slices/tiles rather than computing the inverse of carried forward LUT as well as appropriate index. Non-intra slices may pursue the current model for which a forward LUT is carried.

Figure 11:
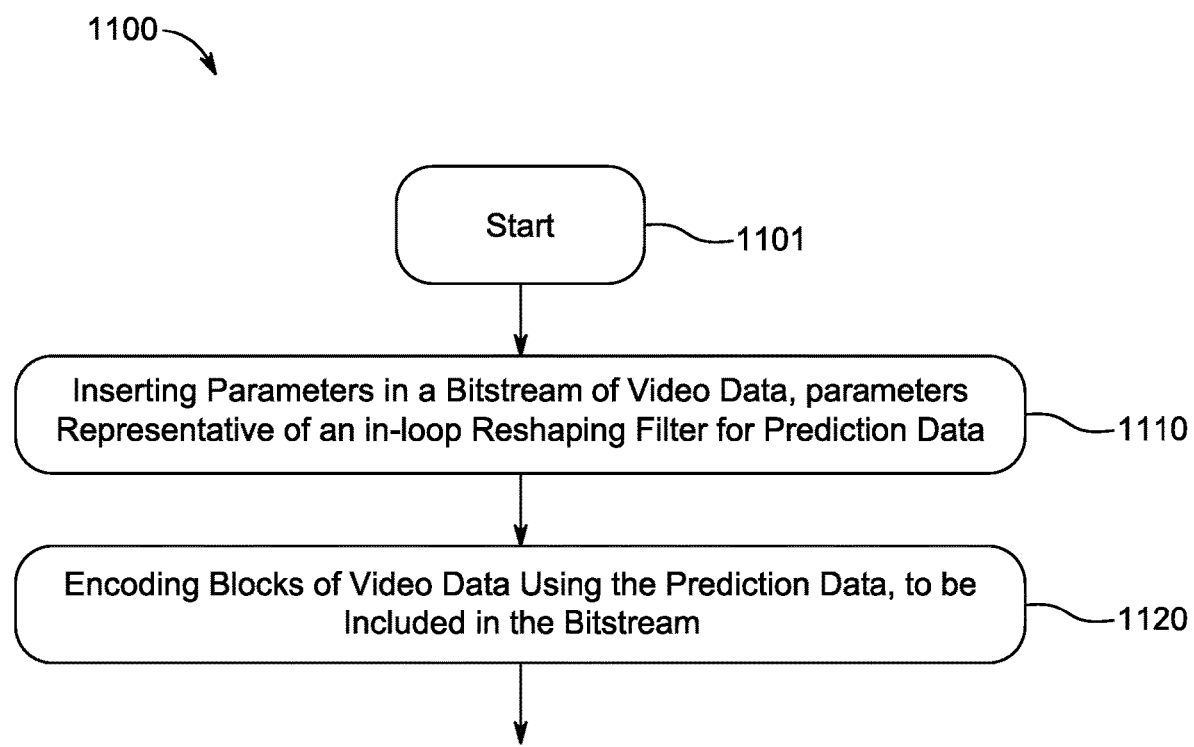
FIG. 11 shows one embodiment of an encoding method under the general aspects described.

One embodiment of a method 1100 using the general aspects described here is shown in FIG. 11. The method commences at Start block 1101 and control proceeds to function block 1110 for inserting parameters in a bitstream of compressed video data, the parameters representative of an in-loop reshaping filter that operates on prediction data. Control then proceeds from block 1110 to block 1120 for encoding blocks of video data using the prediction data for inclusion with the parameters in the bitstream.

Figure 12:
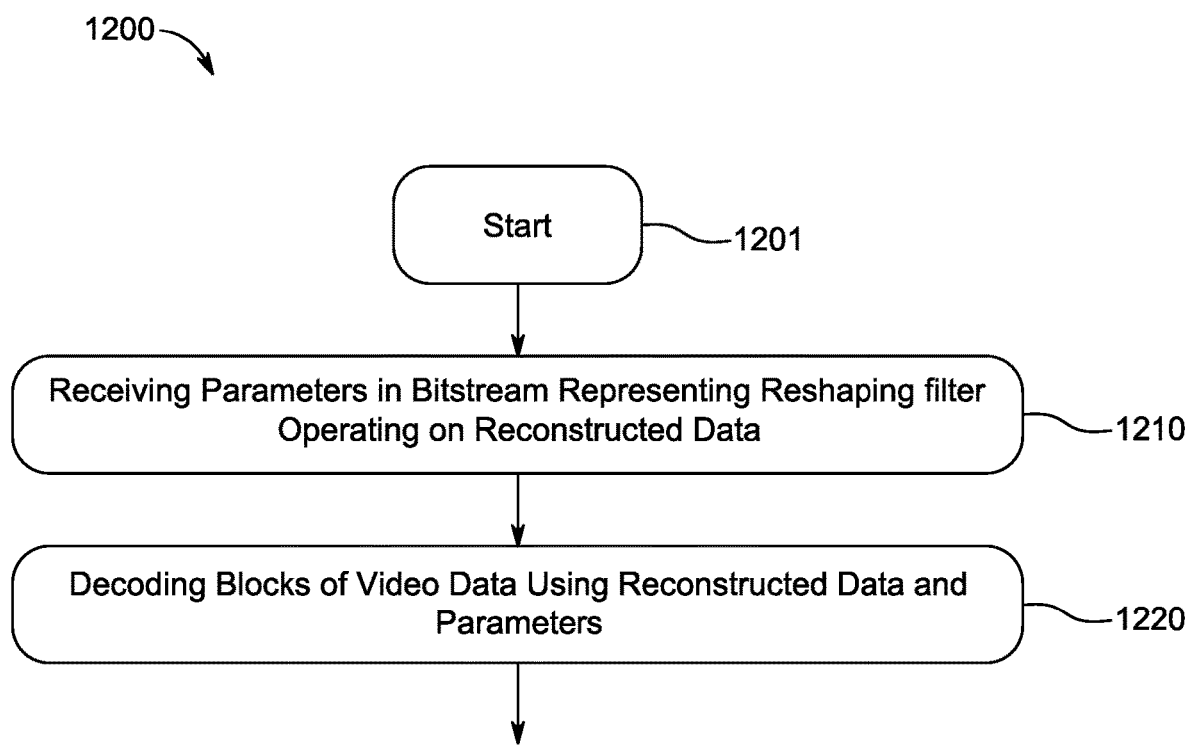
FIG. 12 shows one embodiment of a decoding method under the general aspects described.

One embodiment of a method 1200 using the general aspects described here is shown in FIG. 12. The method commences at Start block 1201 and control proceeds to function block 1210 for receiving parameters in a bitstream of compressed video data, the parameters representative of an in-loop reshaping filter that operates on reconstructed data. Control then proceeds from block 1210 to block 1220 for decoding blocks of video data using the reconstructed data and the parameters from the bitstream.

Figure 13:
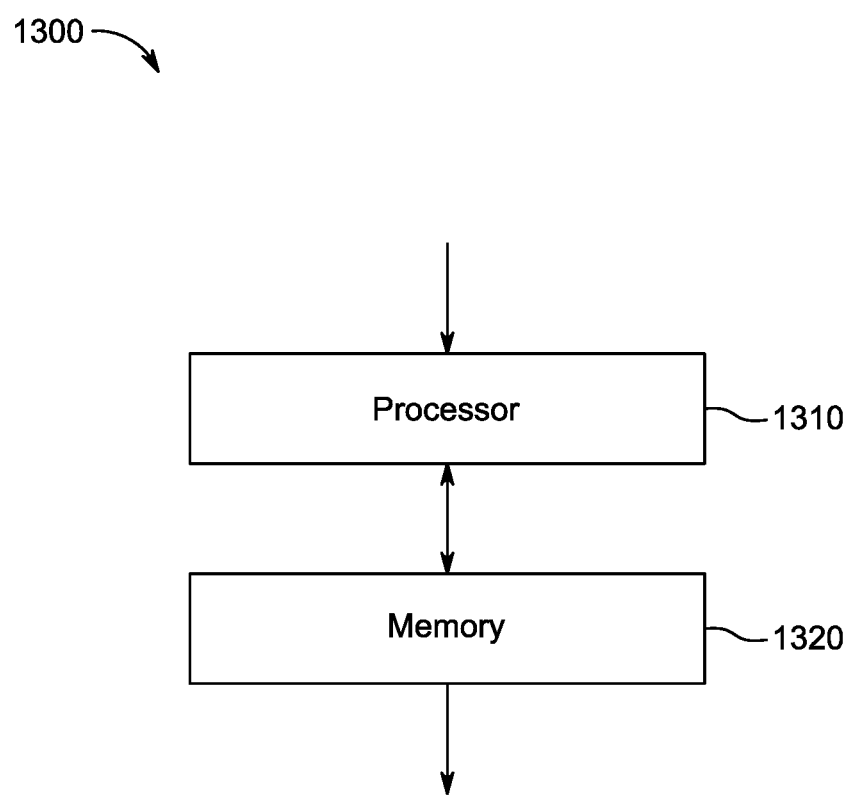
FIG. 13 shows one embodiment of an apparatus for encoding or decoding using intra prediction mode extensions.

FIG. 13 shows one embodiment of an apparatus 1300 for encoding or decoding a block of video data with parameters included in a bitstream. The apparatus comprises Processor 1310 and can be interconnected to a memory 1320 through at least one port. Both Processor 1310 and memory 1320 can also have one or more additional interconnections to external connections.

Processor 1310 is configured to either insert or receive parameters in a bitstream and, either encoding or decoding the block of video data using the parameters.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 14:
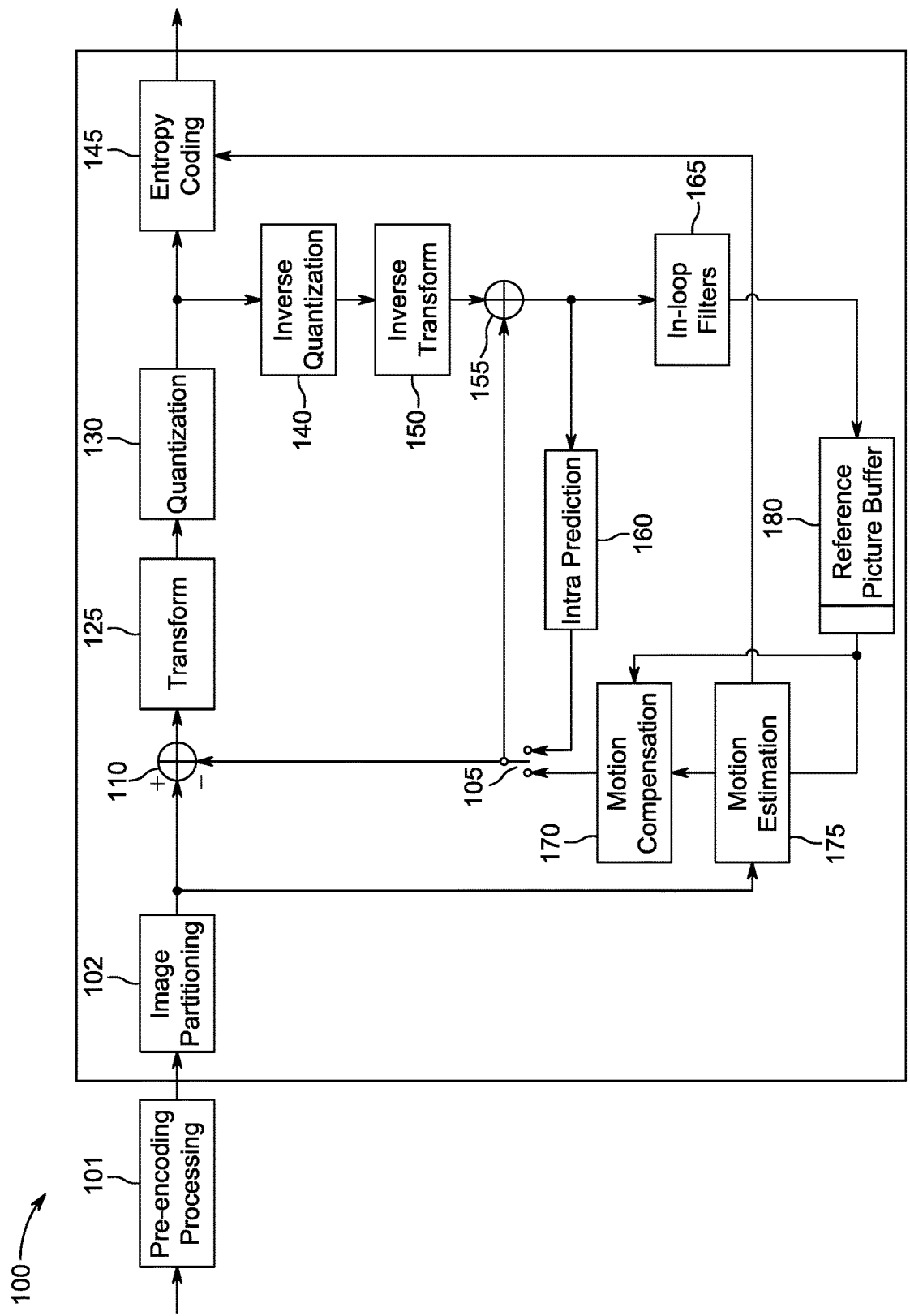
FIG. 14 shows a generic, standard encoding scheme.
Figure 15:
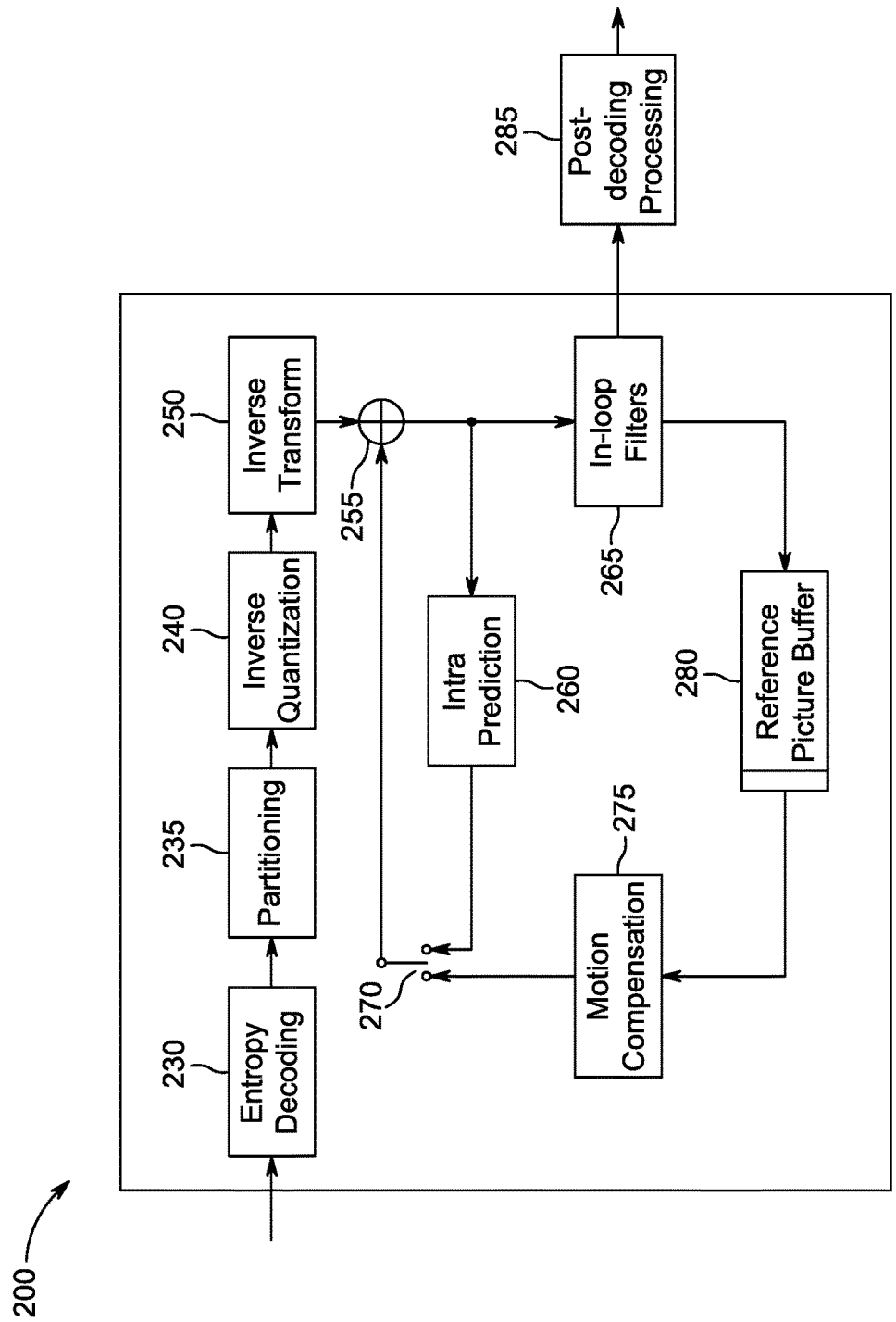
FIG. 15 shows a generic, standard decoding scheme.
Figure 16:
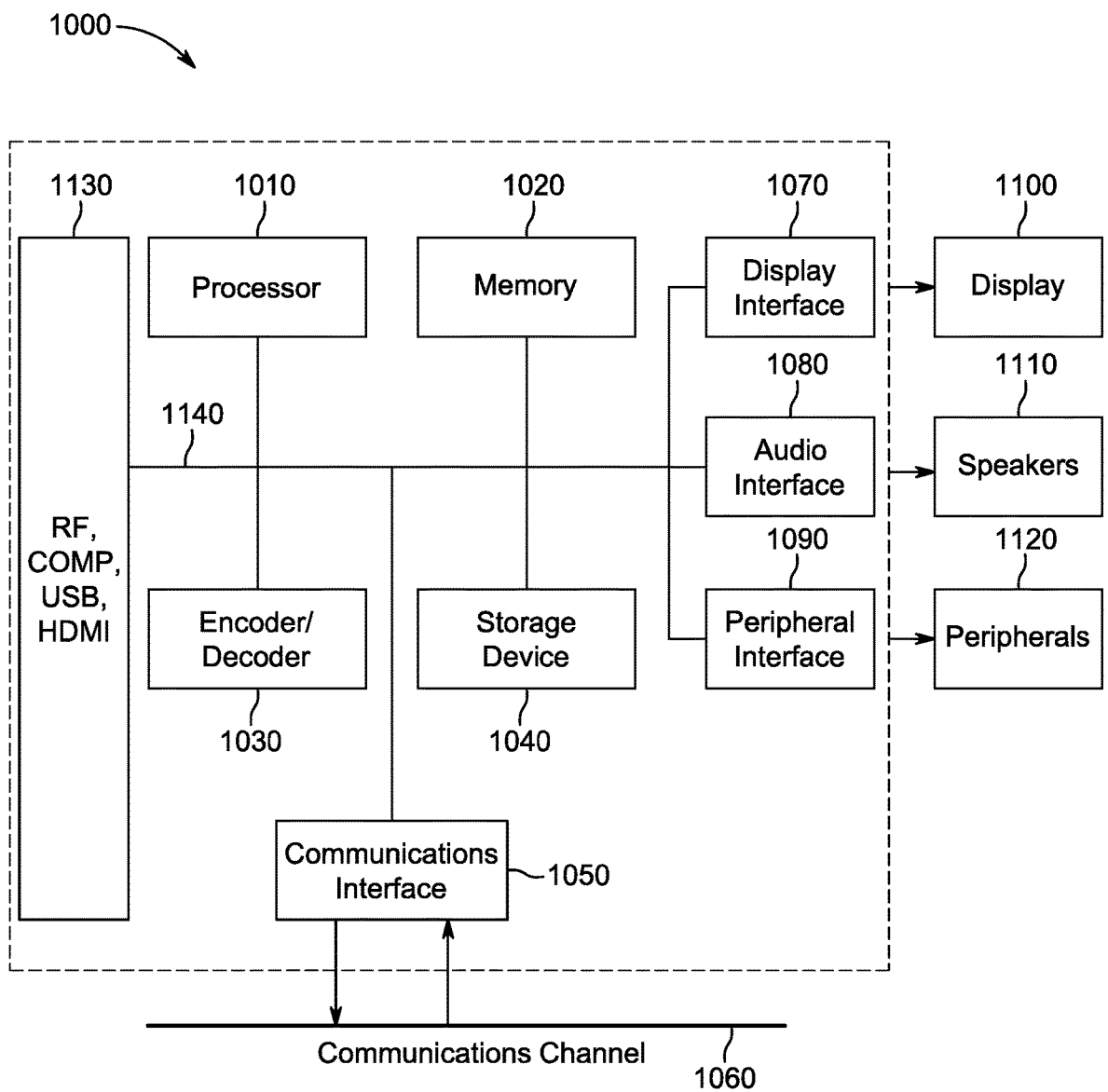
FIG. 16 shows a typical processor arrangement in which the described embodiments may be implemented.

The aspects described and contemplated in this application can be implemented in many different forms. FIGS. 14, 15, and 16 provide some embodiments, but other embodiments are contemplated and the discussion of FIGS. 14, 15, and 16 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 14 and FIG. 15. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 14 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of a video decoder 200. In the decoder 200, a bitstream is decoded by the decoder elements as described below. Video decoder 200 generally performs a decoding pass reciprocal to the encoding pass as described in FIG. 14. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 16, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to perform encoding and decoding with inserted information in a bitstream representative of parameters to implement a forward or an inverse mapping function.

A process or device to perform encoding and decoding with inserted information in a bitstream representative of parameters to implement a forward or an inverse mapping function through a lookup table.

A process or device to perform encoding and decoding with inserted information in a bitstream representative of parameters to implement a forward or an inverse mapping function, where the inverse function is derived from the inserted information.

A process or device to perform encoding and decoding with inserted information in a bitstream representative of parameters to implement a forward or an inverse mapping function, wherein one type of mapping function is used for intra pictures and one type for inter pictures.

A process or device to perform encoding and decoding with inserted information in a bitstream representative of parameters to implement a forward or an inverse mapping function, wherein the information is conveyed in a uniform lookup table.

A process or device to perform encoding and decoding with inserted information in a bitstream representative of parameters to implement a forward or an inverse mapping function, wherein the information is conveyed in a non-uniform lookup table.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
    inserting parameters in a bitstream of compressed video data in association with a picture part, the parameters being representative of a uniformly sampled inverse reshaping look-up table approximating a non-uniformly sampled inverse reshaping look-up table obtained from a uniformly sampled forward reshaping look-up table in case of an intra coded picture part and of the uniformly sampled forward reshaping look-up table in case of an inter coded picture part; and
    encoding blocks of video data using the parameters.

2. An apparatus, comprising:
    a processor, configured to perform:
        inserting parameters in a bitstream of compressed video data in association with a picture part, the parameters being representative of a uniformly sampled inverse reshaping look-up table approximating a non-uniformly sampled inverse reshaping look-up table obtained from a uniformly sampled forward reshaping look-up table in case of an intra coded picture part and of the uniformly sampled forward reshaping look-up table in case of an inter coded picture part; and
        encoding blocks of video data using the parameters.

3. A method for decoding a block of video data, comprising:
    receiving parameters in a bitstream of compressed video data in association with a picture part, the parameters being representative of a uniformly sampled inverse reshaping look-up table in case of an intra coded picture part and of a uniformly sampled forward reshaping look-up table in case of an inter coded picture part; and
    decoding blocks of video data using the parameters from the bitstream.

4. An apparatus, comprising:
    a processor, configured to perform:
        receiving parameters in a bitstream of compressed video data in association with a picture part, the parameters being representative of a uniformly sampled inverse reshaping look-up table in case of an intra coded picture part and of a uniformly sampled forward reshaping look-up table in case of an inter coded picture part; and
        decoding blocks of video data using the parameters from the bitstream.

5. The method of claim 1, wherein an indicator is used to signal whether the parameters are representative of a forward look-up table or an inverse look:$_u$p table.

6. The method of claim 1, wherein a look-up table represented by the parameters in a bitstream applies to an associated coded picture until replaced by another look-up table.

7. A device comprising:
    an apparatus according to claim 4; and
    at least one of (i) an antenna configured to receive a signal, the signal including the blocks of video data, (ii) a band limiter configured to limit the received signal to a band of frequencies that includes the blocks of video data, and (iii) a display configured to display an output representative of the blocks of video data.

8. A non-transitory computer readable medium containing data content generated according to the method of claim 1, for playback using a processor.

9. A non-transitory computer readable medium comprising instructions which, when executed by a computer, cause the computer to carry out the method of claim 3.

10. The method of claim 1, wherein the parameters are pivot points.

11. The apparatus of claim 2, wherein the processor is further configured to perform using an indicator to signal whether the parameters are representative of a forward or an inverse look-up table.

12. The apparatus of claim 2, wherein a look-up table represented by the parameters in a bitstream applies to an associated coded picture until replaced by another look-up table.

13. The apparatus of claim 2, wherein the parameters are pivot points.

14. The method of claim 3, wherein an indicator is used to signal whether the parameters are representative of a forward or an inverse look-up table.

15. The method of claim 3, wherein a look-up table represented by the parameters in a bitstream applies to an associated coded picture until replaced by another look-up table.

16. The method of claim 3, wherein the parameters are pivot points.

17. The apparatus of claim 4, wherein the processor is further configured to perform using an indicator to signal whether the parameters are representative of a forward or an inverse look-up table.

18. The apparatus of claim 4, wherein a look-up table represented by the parameters in a bitstream applies to an associated coded picture until replaced by another look-up table.

19. The apparatus of claim 4, wherein the parameters are pivot points.

* * * * *